(12) United States Patent
Barraud et al.

(10) Patent No.: US 8,939,183 B2
(45) Date of Patent: Jan. 27, 2015

(54) TREAD WITH AN IMPROVED DRAINAGE SPACE

(75) Inventors: Jacques Barraud, Clermont-Ferrand (FR); Agnès Poulbot, Les Martres D'Artiere (FR)

(73) Assignees: Compagnie Generale des Etablissements Michelin, Clermont-Ferrand (FR); Michelin Recherche et Techniques S.A., Granges-Paccot (CH)

( * ) Notice: Subject to any disclaimer, the term of this patent is extended or adjusted under 35 U.S.C. 154(b) by 549 days.

(21) Appl. No.: 13/131,672

(22) PCT Filed: Dec. 2, 2009

(86) PCT No.: PCT/EP2009/066219
§ 371 (c)(1),
(2), (4) Date: Jul. 28, 2011

(87) PCT Pub. No.: WO2010/072523
PCT Pub. Date: Jul. 1, 2010

(65) Prior Publication Data
US 2011/0277898 A1  Nov. 17, 2011

(30) Foreign Application Priority Data

Dec. 22, 2008  (FR) .................................... 08 58893

(51) Int. Cl.
*B60C 11/13* (2006.01)
*B60C 11/12* (2006.01)
(Continued)

(52) U.S. Cl.
CPC ............... *B60C 11/12* (2013.01); *B60C 11/032* (2013.04); *B60C 11/0306* (2013.04);
(Continued)

(58) Field of Classification Search
CPC ............ B60C 11/0041; B60C 11/0306; B60C 11/032; B60C 11/0323; B60C 11/04; B60C 11/042; B60C 11/12; B60C 11/1236; B60C 11/125; B60C 11/1281; B60C 2011/0341; B60C 2011/0355; B60C 2011/0386

USPC ............. 152/209.17, DIG. 3, 209.25, 209.27, 152/901, 209.18
IPC ......................................................... B60C 11/13
See application file for complete search history.

(56) References Cited

U.S. PATENT DOCUMENTS 1,413,190 A  4/1922  Bapson
1,509,259 A  9/1924  Rett et al.
(Continued)

FOREIGN PATENT DOCUMENTS

DE  2 024 279  3/1971
EP  0 540 340  5/1993
(Continued)

OTHER PUBLICATIONS

JP-H05-169913-A English abstract obtained from Patent Abstracts of Japan (http://www19.ipdi.inpit.go.jp) on Aug. 16, 2012, 1 page.
(Continued)

*Primary Examiner* — Justin Fischer
*Assistant Examiner* — Philip N Schwartz
(74) *Attorney, Agent, or Firm* — Dickinson Wright PLLC

(57) ABSTRACT

Tire tread band having a tread surface having at least two wearing layers, a first wearing layer formed by raised elements each having a contact surface, having at least grooves of circumferential orientation, and intended to contact the road surface when new, and at least one wearing layer in contact with the road surface after the first layer has entirely worn away, and containing at least one channel extending in the circumferential direction, and opening onto the tread surface when the wearing layer that precedes it has completely worn away, each wearing layer distinct from the first wearing layer, having transverse incisions distributed in the circumferential direction, extending from a channel of the layer in a direction which is not circumferential, opening fully or partially into at least one other circumferentially oriented channel or groove, irrespective of the level of wear of the other wearing layer.

8 Claims, 3 Drawing Sheets

(51) Int. Cl.
   *B60C 11/03* (2006.01)
   *B60C 11/04* (2006.01)
(52) U.S. Cl.
   CPC ............ *B60C 11/0323* (2013.04); *B60C 11/04* (2013.01); *B60C 11/125* (2013.04); *Y10S 152/901* (2013.01); *Y10S 152/03* (2013.01)
   USPC ............ 152/209.17; 152/209.18; 152/209.27; 152/901; 152/DIG. 3

(56) References Cited

U.S. PATENT DOCUMENTS

| | | |
|---|---|---|
| 2,121,871 A | 6/1938 | Havens |
| 2,121,955 A | 6/1938 | Eger |
| 2,264,767 A | 12/1941 | Ofensend |
| 2,327,057 A | 8/1943 | Ofensend |
| 2,637,362 A | 5/1953 | Briscoe et al. |
| 2,696,863 A | 12/1954 | Ewart et al. |
| 3,115,919 A | 12/1963 | Roberts |
| 3,373,790 A | 3/1968 | Newman et al. |
| 3,653,422 A | 4/1972 | French |
| 3,770,040 A | 11/1973 | De Cicco |
| 3,945,417 A | 3/1976 | Harrelson, Jr. |
| 3,998,256 A | 12/1976 | Verdier |
| 4,703,787 A | 11/1987 | Ghilardi |
| 4,723,584 A | 2/1988 | Yamaguchi et al. |
| 4,794,965 A | 1/1989 | Lagnier |
| 4,832,099 A | 5/1989 | Matsumoto |
| 4,994,126 A | 2/1991 | Lagnier |
| 5,316,063 A | 5/1994 | Lagnier |
| 5,445,691 A * | 8/1995 | Nakayama et al. ........ 152/209.6 |
| 5,503,207 A | 4/1996 | Fujiwara et al. |
| 5,535,798 A | 7/1996 | Nakamura |
| 5,769,977 A | 6/1998 | Masaoka |
| 5,783,002 A | 7/1998 | Lagnier |
| 6,012,499 A | 1/2000 | Masaoka |
| 6,102,092 A | 8/2000 | Radulescu |
| 6,123,130 A | 9/2000 | Himuro |
| 6,196,288 B1 | 3/2001 | Radulescu et al. |
| 6,315,018 B1 | 11/2001 | Watanabe |
| 6,382,283 B1 | 5/2002 | Caretta |
| 6,408,910 B1 | 6/2002 | Lagnier et al. |
| 6,412,531 B1 | 7/2002 | Janajreh |
| 6,439,284 B1 | 8/2002 | Fontaine |
| 6,443,200 B1 | 9/2002 | Lopez et al. |
| 6,461,135 B1 | 10/2002 | Lagnier et al. |
| 6,467,517 B1 | 10/2002 | Radulescu |
| 6,668,885 B2 | 12/2003 | Ishiyama |
| 6,668,886 B1 | 12/2003 | Iwamura |
| 6,761,197 B2 | 7/2004 | Carra et al. |
| 6,776,204 B2 | 8/2004 | Cesarini et al. |
| 6,799,616 B2 | 10/2004 | Himuro |
| 7,017,634 B2 | 3/2006 | Radulescu et al. |
| 7,249,620 B2 | 7/2007 | Croissant et al. |
| 7,793,692 B2 | 9/2010 | Nguyen et al. |
| 2002/0033214 A1 | 3/2002 | Carra et al. |
| 2005/0081972 A1 | 4/2005 | Lopez |
| 2005/0121124 A1 | 6/2005 | Tsubono |
| 2006/0088618 A1 | 4/2006 | Radulescu et al. |
| 2007/0095447 A1 | 5/2007 | Nguyen et al. |
| 2007/0199634 A1 | 8/2007 | Sakamaki |
| 2007/0295434 A1 | 12/2007 | Nguyen et al. |
| 2009/0065115 A1 | 3/2009 | Mathews |
| 2009/0159167 A1 | 6/2009 | Scheuren |
| 2009/0301622 A1 | 12/2009 | Brown |
| 2011/0277898 A1 | 11/2011 | Barraud et al. |

FOREIGN PATENT DOCUMENTS

| | | |
|---|---|---|
| EP | 0 721 853 | 7/1996 |
| EP | 1 103 362 A | 5/2001 |
| EP | 1782970 | 9/2007 |
| EP | 1920951 | 5/2008 |
| EP | 1935671 | 6/2008 |
| FR | 2 763 892 A | 12/1998 |
| GB | 474588 | 11/1937 |
| GB | 2061837 | 5/1981 |
| JP | 02-060805 | 3/1990 |
| JP | 2310108 | 12/1990 |
| JP | 03090317 | 4/1991 |
| JP | 112705 | 5/1991 |
| JP | 03112705 | 5/1991 |
| JP | 5338412 | 12/1998 |
| JP | 2001 063323 | 3/2001 |
| JP | 2001-130227 | 5/2001 |
| JP | 2004009886 | 1/2004 |
| JP | 2005104194 | 4/2005 |
| JP | 2006051863 | 2/2006 |
| WO | 0238399 | 5/2002 |
| WO | WO 03/097384 A | 11/2003 |
| WO | 2010030276 | 3/2010 |
| WO | 2010/039148 | 4/2010 |

OTHER PUBLICATIONS

JP 2002-501458A English abstract obtained from Espacenet (http://worldwide.espacenet.com) on Aug. 16, 2012, 2 pages.
International Search Report (PCT/ISA/210) issued on Mar. 15, 2010, by European Patent Office as the International Searching Authority for International Application No. PCT/EP2009/066219.
PCT/US2008/075940 International Search Report and Written Opinion dated Nov. 18, 2008.
PCT/US2008/063801 International Search Report and Written Opinion dated Feb. 16, 2009.

* cited by examiner

TREAD WITH AN IMPROVED DRAINAGE SPACE

This invention relates to the field of tyre tread bands and, more specifically, this invention relates to tyre tread bands for vehicles of the heavy goods vehicles type, these tread bands having a tread surface the geometry of which varies with wear. This invention also relates to a mould for moulding such treads.

Tyre tread bands extend in the circumferential direction on the outside of a tyre to provide contact between the tyre and the road surface. Contact between the tyre tread band and the road surface occurs in a contact patch. A tread band has the role of providing sufficient grip in order to prevent the tyre from slipping, which slippage could arise under acceleration, braking or cornering. A tyre tread band comprises raised elements, such as ribs or blocks, these raised elements being delineated by grooves (namely cuts with an average width in excess of 2 mm). Further, these raised elements may be provided with incisions, namely with cuts of a width equal to 2 mm at most. The role of these incisions is to create additional edges while at the same time maintaining a large quantity of rubber compound. These incisions may be of the blocking type, namely may, on the opposing walls delineating them, have means that limit the relative movements of the said walls.

One problem that each tyre manufacturer seeks to resolve is that of increasing the distance that a tyre tread band can cover before the tyre has to be replaced. One solution is to increase the thickness of the tread band; although this increase is a step in the right direction because it provides more material that can be worn away, an appreciable increase in hysteresis losses and therefore in rolling resistance (namely the amount of energy consumed by the tyre as it rolls along) is also observed. Accordingly, it is rather more desirable to reduce the thickness of a tyre tread band, as this has the effect of increasing the stiffness of the tread band and thus of reducing thermal losses through hysteresis. In this alternative approach, it is possible to use rubber-based compounds that have better wear performance. Reducing the thickness of the tread band may allow the use of rubber compounds that have higher hysteresis.

Another common problem faced by tyre manufacturers is that of maintaining tyre performance throughout the working life of the tyre, namely irrespective of the level of wear of the tread band. Usually, the hollow volume of the grooves, which is needed to ensure good drainage of water when driving on a wet road surface, decreases with tread wear. It is an objective of the invention to obtain a tread band of which the performance in terms of grip following partial wear is maintained, while at the same time ensuring that this tread maintains a low rolling resistance and good wear performance.

Accordingly, there is a need for a tyre tread band that comprises a volume of cuts after it is partially worn, but without this impairing the performance of the tyre, regardless of its level of wear, and notably in the new condition.

The invention consists of a tyre tread band having a tread surface to come into contact with the road surface, this tread band comprising at least two wearing layers which are superposed in the thickness of the tread, each wearing layer having a thickness. In the new condition, this tread band has:
 a first wearing layer formed by a plurality of raised elements each comprising a contact surface, this first layer comprising at least grooves of circumferential overall orientation, this first layer being intended to be in contact with the road surface when the tread is new and up to a level of wear that corresponds to the thickness of this wearing layer,
 at least one other wearing layer coming into contact with the road surface after the first layer has entirely worn away, this at least one other wearing layer comprising at least one channel extending in the circumferential overall direction, this at least one channel opening onto the tread surface as soon as the said wearing layer is reached after the wearing layer that proceeds it has completely worn away.

This tread band is such that each wearing layer, distinct from the first wearing layer, further comprises a plurality of transverse incisions distributed in the circumferential direction, each transverse incision extending from a channel of the layer in question in a direction which is not circumferential so as to open fully or partially into at least one other circumferentially oriented channel or groove, and do so irrespective of the level of wear of the said other wearing layer.

Thus the depths of the longitudinal grooves in the new condition can be reduced, causing new grooves to appear after partial wear has worn away the first wearing layer while at the same time transverse incisions are caused to appear in the new wearing layer. This then appreciably limits the compressibility of the tread and the dissipation of energy in the tread in the new condition is accordingly limited, all the more so since the incisions do not open onto the tread surface in the new condition but appear only following partial wear so as to give the tread satisfactory traction in the second phase of its use.

It is also essential that each new transverse incision should open into another groove so as to achieve mechanical decoupling between the elements of the tread band that are situated on each side of this incision. The reason for this is to prevent that part of the element that is leaving the contact patch from taking with it that part of the same element that is situated on the other side of the incision.

In an advantageous alternative form, the maximum drainage volume of each wearing layer is at least equal to 60% of the maximum drainage volume of the first wearing layer, namely of the drainage volume of the tread band in the new condition. The maximum drainage volume of a wearing layer is evaluated by multiplying the mean length of the contact patch under nominal conditions of use by the sum of the cross-sectional areas of the grooves opening onto the tread surface in the wearing layer considered.

In an improved form of the invention, the first wearing layer of the tread band further comprises a plurality of holes, each hole opening onto the tread surface when the tread is in the new condition and into a channel of the inner wearing layer that follows the first layer. Each hole has main cross-sectional dimensions which are at least equal to 30%, and more preferably still, at least equal to 50%, of the transverse dimension of the channel into which the said hole opens. The main cross-sectional dimensions of a hole here mean its diameter if the hole is of circular cross section, its major and minor axes if its cross section is oval, or its width and length if it is of rectangular cross section.

For preference, the number of holes opening into a channel is chosen so that there is a plurality of holes in the region in which the tread band makes contact with the road surface. It is advantageous for this number to be such that the spacing between two successive holes is less than or equal to one-fifth of the mean length of the contact patch. The mean length of the contact patch is determined for pressure and loading conditions that correspond to the nominal conditions under which the tyre provided with that tread band is used (these conditions being provided, notably, by the ETRTO). The presence of these holes has the advantage both of reducing the temperature in the tread by ventilating it and also of better revealing the new groove once a wearing layer situated immediately above it (namely between the wearing layer containing the channel and the tread surface of the tread band) has completely worn away. Indeed it has been found that the way in which a new groove is revealed from a channel could be improved by the presence of holes which create sorts of discontinuities on that part bounding the channel that is first to come into contact with the road surface after the previous layer has worn away.

Advantageously, each hole opens into a channel at the point at which at least one transverse incision opening into the said channel starts.

Other features and advantages of the invention will emerge from the description given hereinafter with reference to the attached drawings which, by way of nonlimiting examples, illustrate some embodiments of the subject matter of the invention.

FIG. 1 is a partial view of a tread band according to the invention, comprising two wearing layers in its thickness;

FIG. 2 is a view in section on II-II of the tread band shown in FIG. 1;

FIG. 3 is a plan view of the tread surface when the second wearing layer of the tread band shown in FIG. 1 has been reached;

FIG. 4 is a view of an alternative form of the invention comprising a plurality of holes linking each channel to the tread surface of the tread in the new condition;

FIG. 5 is a view in section of the alternative form shown in FIG. 4;

FIG. 6 shows an alternative form of tread band according to the invention, comprising three wearing layers in its thickness;

FIG. 7 shows a view of the tread surface of another alternative form of tread according to the invention, in which the incisions open onto the said surface;

FIG. 8 is a view in section on VIII-VIII of the tread shown in FIG. 7.

DEFINITIONS

The equatorial plane of the tyre is a plane which is perpendicular to the axis of rotation of the tyre and which divides the said tyre into two half-tyres. This equatorial plane notably contains those points on the tyre which are radially furthest from the axis of rotation.

A first point is said to be radially on the outside of a second point when this first point is at a distance from the axis of rotation which is greater than the distance of the second point from this axis of rotation.

A meridian section through a tyre is a section through the tyre made in a plane containing the axis of rotation of the tyre.

A circumferential direction here means a direction tangential at all points to a circle centred on the axis of rotation.

A radial direction here means a direction perpendicular to the axis of rotation.

An axial or transverse direction here means a direction which is perpendicular to the radial direction and parallel to the axis of rotation of the tyre.

DESCRIPTION OF THE FIGURES

For ease of reading, one and the same reference is used for all alternative forms the description of which follows, when this reference indicates an element that has the same structure and performs the same function.

Also discernible, on each side of each channel, is an incision which extends as far as the grooves 20. Thus, when the level of wear reaches the second wearing layer C2—after the first wearing layer C1 has completely worn away, the channels form new grooves that supplement the grooves 20. In this way, the area of groove in contact with the road surface is appreciably increased, while at the same time regaining a grooves volume that is substantially equal to the volume there was in the new condition. Moreover, the presence of the transverse incisions 31 only in the second wearing layer makes it possible for the tread in its initial condition to have a high overall rigidity which is beneficial to reducing hysteresis losses by deformation, while at the same time creating mechanical decoupling between the parts of the new ribs that are situated on each side of these incisions when the second wearing layer is active in contact with the road surface.

Figure 3:
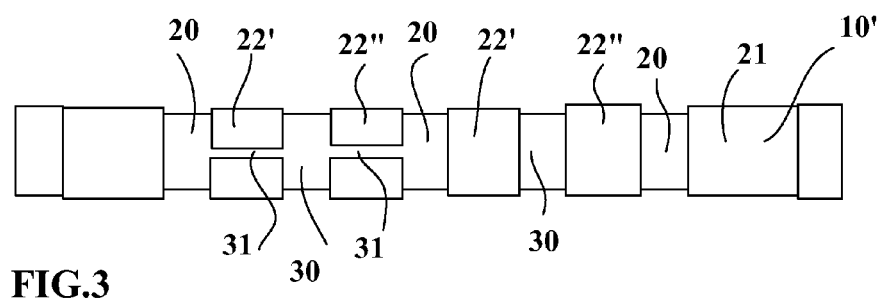

FIG. 3 is a plan view of the new tread surface 10' when the second wearing layer of the tread band becomes active. Each rib 22 is replaced by new ribs 22' and 22'', these new ribs delimiting the groove formed by the channel 30 opening onto the new tread surface 10'. It can be seen in this FIG. 3 that these new ribs have discontinuities in the circumferential direction caused by the presence of the incisions 31 that open both into a groove 20 and into the channel 30; because there is a plurality of incisions permanently in the contact, these discontinuities provide mechanical decoupling between those parts of one and the same new rib 22' or 22'' that are situated circumferentially on each side of each incision.

Figure 2:
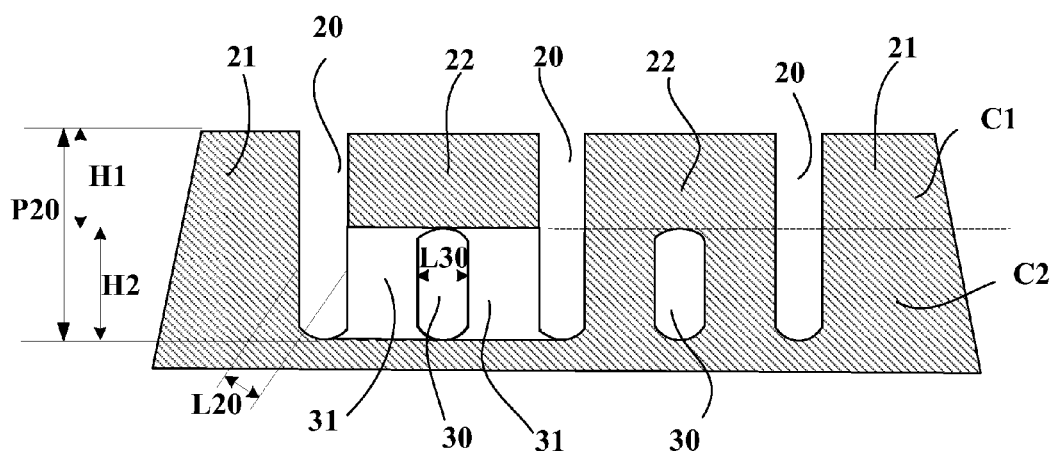
FIG. 2 shows a section on a plane of section identified by its line II-II on the tread surface 10 of the tread band shown in FIG. 1. In this cross section it may be seen that the channels 30 are at a distance H1 from the tread surface in the new condition: this thickness H1 defines a first wearing layer in which only the grooves 20 are present and active. The channels 30 have a height H2 measured in the direction of the thickness of the tread: this height H2 defines a second wearing layer C2 which brings into play both the main grooves 20 and new grooves which are formed as soon as the level of tread wear is at least equal to the height H1.

FIG. 2 shows that the grooves 20 open onto the tread surface 10 of the tread band in the new condition and all have the same width L20 and the same depth P20; this depth P20 is substantially equal to the sum of the heights H1 and H2 of the first and second wearing layers C1 and C2 respectively. In this particular instance, the drainage volume of the first wearing layer is equal to three times the drainage volume afforded by each circumferential groove 20. The volume of each groove 20 is substantially proportional to the cross-sectional area of the said groove in the plane of the figure. When this first wearing layer has worn away, namely when the second wearing layer appears, the drainage volume is at a level substantially equal to 75% of the volume of the first wearing layer in the new condition. This new drainage volume is obtained by adding the volumes of the new grooves formed by the channels 30 to the drainage volume of the three circumferential grooves 20 of remaining depth H2.

Figure 1:
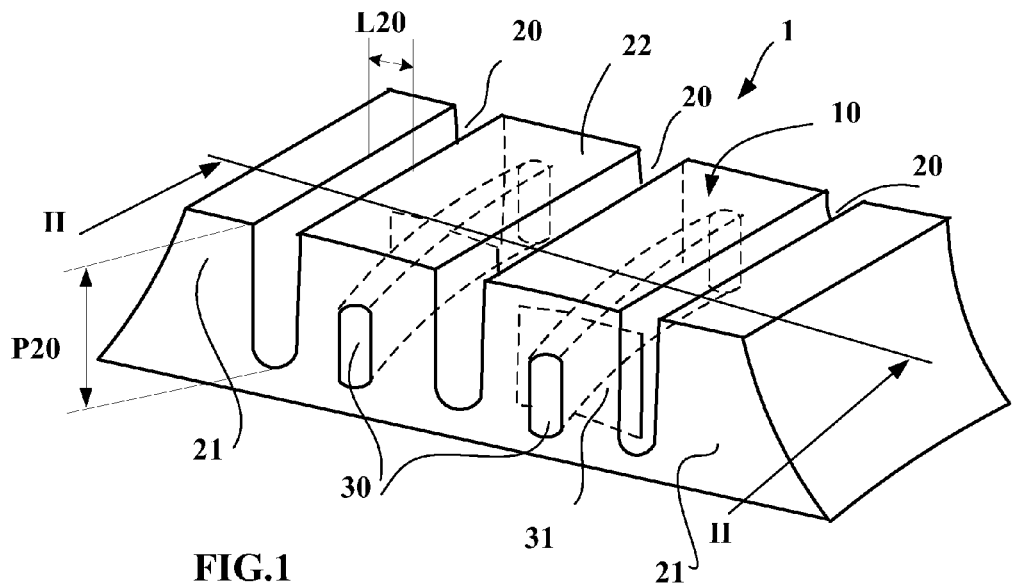
FIG. 1 shows a partial view of a tread band 1 of a tyre constructed in accordance with the invention. This tread 1 comprises a tread pattern formed by three main grooves 20 which are oriented circumferentially and delimit intermediate ribs 22 and, axially on each side of these intermediate ribs, edge ribs 21, these grooves opening onto a tread surface 10 that is intended to be in contact with the road surface during running. The tread 1 depicted here corresponds to the tread in the unworn new condition. In this condition, the grooves all have the same depth P20 and a width L20 which are useful notably for draining away the water that is present on the road surface under rainy conditions. Also discernible in this first figure is the presence of channels 30 oriented circumferentially in the two intermediate ribs 22; in addition, these channels are intersected by incisions 31 that open into the grooves 20.
Figure 4:
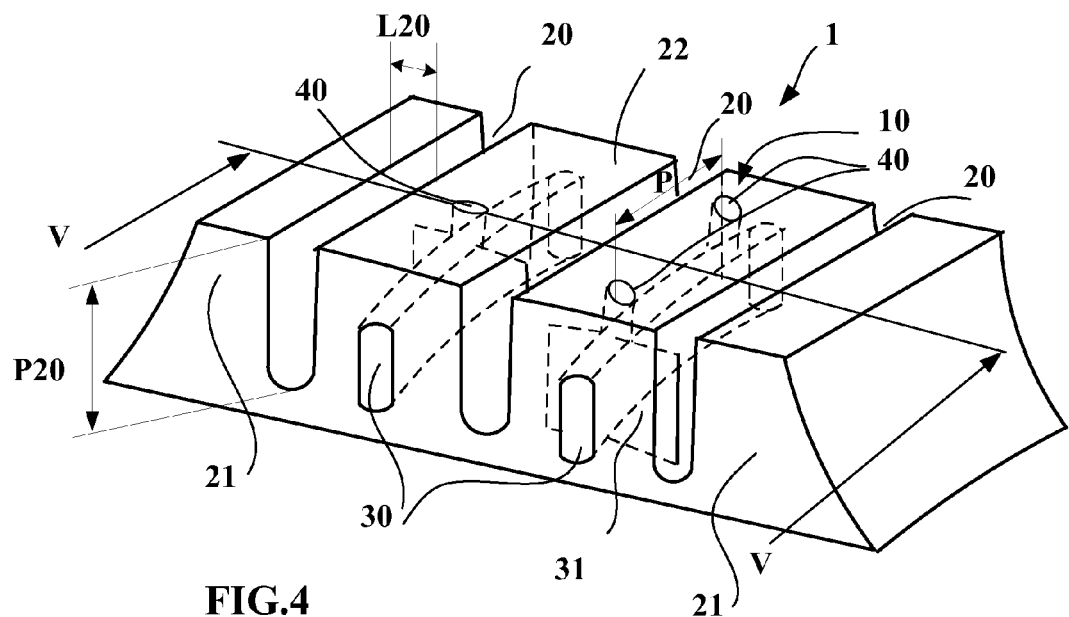
Figure 5:
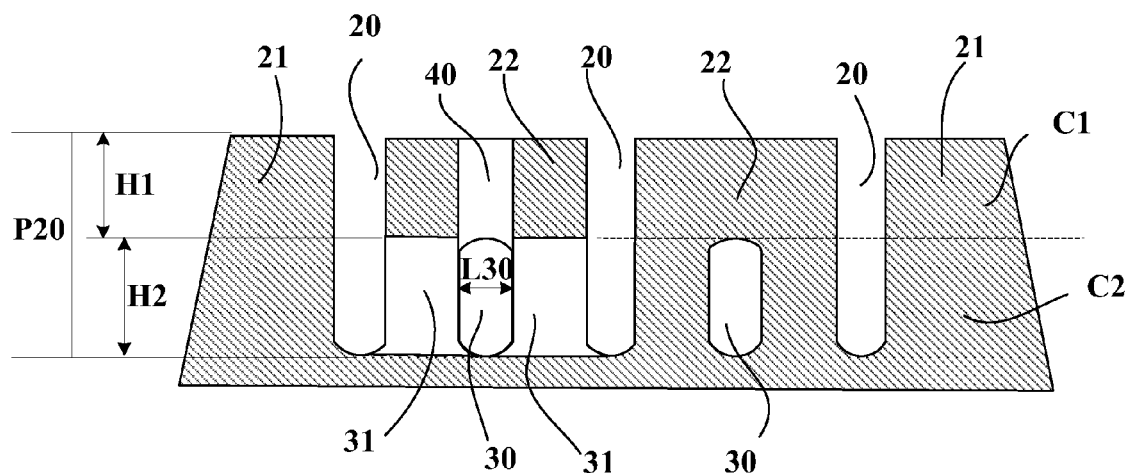

In the alternative form shown in FIGS. 4 and 5, a new element has been introduced by comparison with the alternative form of FIGS. 1 to 3, and this is the presence of holes of cylindrical shape and circular cross section, these holes opening onto the tread surface of the tread band in the new condition and passing through the first wearing layer to open into a channel 30.

These holes have a diameter equal to at least 30% of the width L30 of the channel 30. In this particular instance, this diameter is equal to the width L30. These holes here are oriented in the radial direction but the person skilled in the art could angle them if need be. The cross-sectional shape of each hole could also be elliptical; advantageously, the major axis of the ellipse is oriented in the circumferential direction.

By virtue of a sufficient number of such holes, that is to say of holes at a spacing P shorter than one-fifth of the length of the contact patch obtained under nominal conditions of the tyre provided with the tread, the formation of the new grooves is appreciably improved as the tread band becomes worn. It is advantageous, as is the case in the example depicted, for these holes to coincide with the position of the incisions that connect the channels to the other channels or to the grooves.

For the two alternative forms that have just been described, moulding can be performed by moulding the various grooves, channels and incisions and holes using a mould that moulds the radially external surface and the radially internal surface of a tread before the said tread is incorporated onto a tyre blank in the same way as is used for the retreading of worn tyres.

Figure 6:
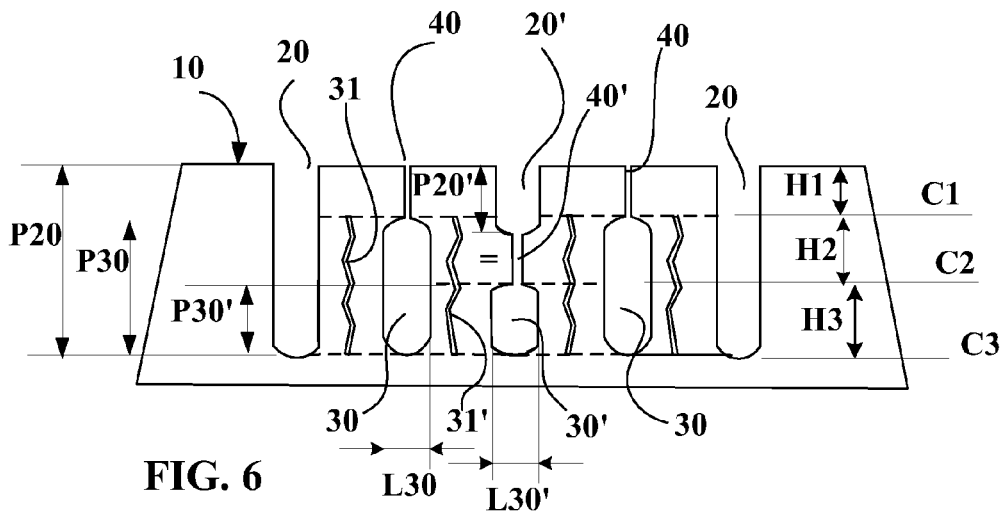

Another alternative form of tread band according to the invention is shown in section in FIG. 6. In this section it may be seen that the tread band comprises three wearing layers C1, C2, C3 respectively starting from the first wearing layer C1 which is visible on the tread in the new condition. These wearing layers have respective thicknesses H1, H2, H3 which increase from the first wearing layer to the last one which is furthest towards the inside of the tread. When the tread is new, only the grooves 20 of depth P20 open onto the tread surface 10, together with another groove 20' the depth P20' of which is substantially equal to the thickness H1 of the first wearing layer C1.

Radially on the inside of this groove P20' is formed a channel 30' of length L30' and of a depth P30' equal substantially to the thickness of the third wearing layer C3. Formed between the groove P20' and this channel 30' are a plurality of holes 40' which open into the groove P20' and into the channel 30'.

Axially between a groove 20 and the groove 20' there may be seen a channel 30 of depth P30 and of width L30, each channel being provided on each side by zigzag incisions 31 in the depth and opening on one side into the said groove 20 and on the other side partly into the groove 20' and partly into the channel 30'. The channels 30 are provided with holes 40 which extend them radially outwards into the first wearing layer C1.

The channel 30' formed under the groove 20' is provided on each side with a plurality of zigzag incisions 31' in the depth, these incisions 31' opening into the channels 30.

The second wearing layer C2, of height H2, is formed between the outermost part of the channels 30 and the outermost part of the channel 30' situated radially under the groove 20'.

Figure 7:
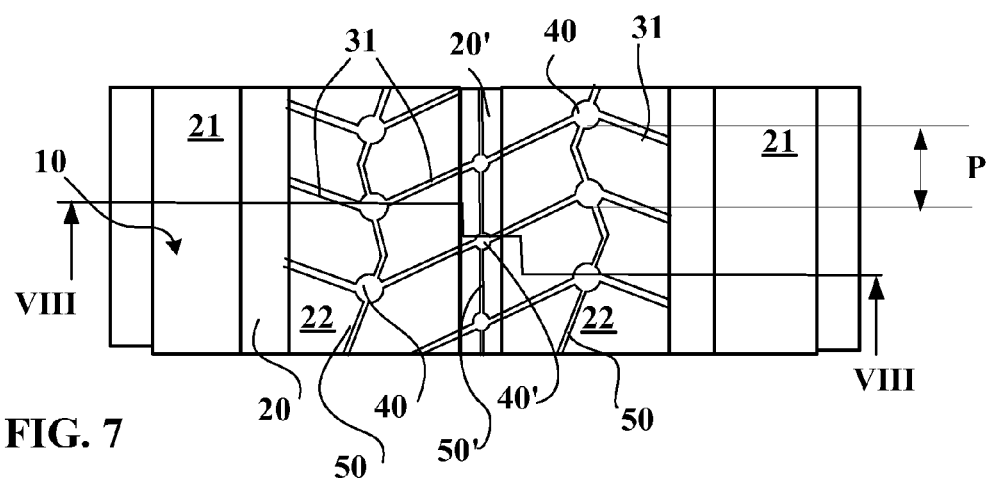
Figure 8:
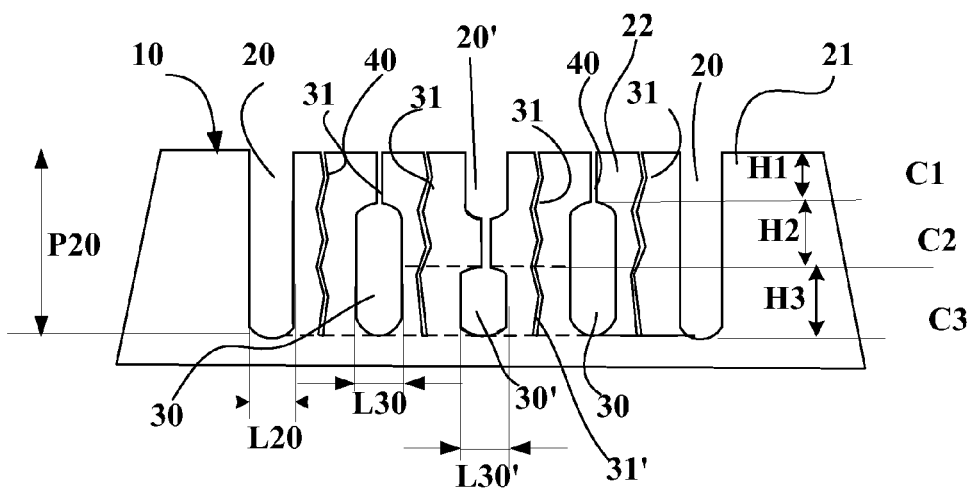

The last alternative form shown in FIGS. 7 and 8 is quite similar to the alternative form of FIG. 6, there being at least one difference in that the incisions 31 are extended as far as the tread surface of the tread band in the new condition. In this alternative form, the transverse incisions of a wearing layer other than the first wearing layer are extended by complementary incisions that pass through at least one other wearing layer. This tread band is fitted to a tyre of 315/70 R22.5 size; the nominal conditions of use are an inflation pressure of 8 bar, and a carried load of 3000 daN. Under these nominal conditions, the mean length of the contact patch is equal to 200 mm.

As can be seen in FIG. 7 which is a plan view of the tread surface 10 of the tread band in the new condition, three circumferential grooves 20, 20' delimit grooves 21 forming the axial edges of the tread and ribs 22 situated axially between the edge ribs. In this FIG. 7 it may be seen that a plurality of holes 40 is formed on each intermediate rib 22, these holes being extended axially on each side by incisions 31 of which the lines on the tread surface 10 are inclined such that they form a V. In this particular instance, the incisions 31 of an intermediate rib 22 form a V pointing in the opposite direction to the V formed by the incisions of the other intermediate rib. In the bottom of the groove 20', located substantially in the median plane of the tread band, holes 40' of cylindrical shape may be seen. When viewed on the tread surface, the angle made by the incisions 31, 31' in this instance is 30 degrees to the transverse direction (namely the direction of the axis of rotation of the tyre provided with the tread).

Furthermore, the holes 40 and 40' are linked to one another on each rib 22 and in the bottom of the groove 20' by an additional zigzag-shaped incision 50, 50' respectively. These incisions 50, 50' open on the inside of the tread into the channels 30 and 30', respectively. In this case, the first wearing layer C1 is provided over its entire height with circumferentially oriented incisions (or, and this is equivalent, longitudinally oriented ones) opening onto the tread surface when the tread is in the new condition and extending as far as the next wearing layer to open onto a channel of this next layer. These additional incisions 50, 50' heighten the beneficial effect afforded by the holes (40) that they link together for a better creation of the new grooves when the wearing layers C2 and C3 appear at the tread surface following wear.

FIG. 8 is a cross section through this tread in a plane of section of which the line in FIG. 7 follows the line VIII-VIII. This FIG. 8 shows substantially the same cross section as is shown in FIG. 6, except that the incisions 31 also open onto the tread surface of the tread in the new condition. Moreover, the incisions 31' are formed in the continuation of the incisions 31 situated axially on each side. Through this arrangement it is easy for this tread to be moulded by moulding it in a mould provided with relief elements suited to moulding the grooves, incisions and underlying channels.

The spacing P between the holes, whatever the rib considered, is equal to 25 mm (which in this instance is also the spacing between the transverse incisions). The holes formed in the ribs 22 have a circular cross section and a diameter of 4 mm. The width L20 of the grooves 20 is equal to 6 mm, their depth P20 is equal to 15 mm, the width L30 of the channels 30 is equal to 5 mm, the width L30' of the channel 30' is equal to 8 mm (this width L30' is equal to the width of the groove 20' situated radially on the outside of the channel 30'). The thicknesses H1, H2, H3 of the three wearing layers are all equal to 5 mm. The drainage volume of the tread band in the new condition calculated for the mean length of contact patch is substantially equal to 44 cm$^3$. The drainage volume of the tread band after the first wearing layer C1 has worn away and at the instant that the second wearing layer C2 appears, calculated for the same mean length of contact patch, is substantially equal to 44 cm³. The drainage volume of the tread band after the second wearing layer C2 has worn away and at the instant that the third wearing layer C3 appears, calculated for the same mean length of contact patch, is substantially equal to 30 cm³.

It may be seen that, by virtue of the tread band according to the invention, it is possible to reduce the drainage volume in the new condition while of course still having a sufficient volume for good drainage performance when driving on wet ground. This reduction makes it possible to have a stiffer tread by comparison with conventional tread bands. Further, the appearance of new grooves for each new wearing layer means that it is possible to keep a high drainage volume by comparison with conventional tread bands after the same degree of wear. In this particular instance, the drainage volume of the second layer is equal to the drainage volume in the new condition, while the drainage volume of the third layer is kept at a relatively high level, if compared to the drainage volume of a tread band of the state of the art, because this drainage volume is equal to 68% of the drainage volume in the new condition.

Advantageously, the transverse incisions in the wearing layers are incisions that are blocking at least in one direction, for example having zigzags or undulations in the depth direction or in several different directions, for example double zigzags or double undulations both in the depth direction and in the length direction of the incision.

In another alternative form that is not depicted here, at least some of the transverse incisions are extended on the inside of the tread by a widened part that forms a channel of transverse overall orientation, which is open at both ends.

The invention is not restricted to the examples described and depicted and various modifications can be made thereto without departing from its scope.

The invention claimed is:

1. A tire tread band comprising:
    a tread surface to come into contact with the road surface;
    at least two wearing layers superposed in the thickness direction of the tread, comprising:
        a first wearing layer formed by a plurality of raised elements each comprising a contact surface, and intended to be in contact with the road surface when the tread is new, and comprising at least grooves of circumferential overall direction; and
        at least one other wearing layer disposed radially inward of the first wearing layer and adapted to come into contact with the road surface after the first layer has entirely worn away, comprising:
            at least grooves of circumferential overall direction that extend from the first wearing layer through the at least one other wearing layer;
            at least one channel extending in the circumferential overall direction, this at least one channel disposed radially inward of the first wearing layer, enclosed within the tread band when the tread is new, and opening onto the tread surface to, form another groove of circumferential overall direction as soon as the other wearing layer is reached after the first wearing layer or other wearing layer that immediately precedes it has completely worn away, and having a bottom at a same radial level as a bottom of the groove of circumferential overall direction, and distinct from the first wearing layer, a plurality of transverse incisions distributed in the circumferential direction, each transverse incision extending from the at least one channel of the other wearing layer, or from the other groove of circumferential overall direction formed therefrom when the other wearing layer is reached in a direction which is not circumferential, so as to open fully or partially into the at least one groove of circumferential overall direction, and do so irrespective of the level of wear of the other wearing layer.

2. The tread band according to claim 1, wherein the first wearing layer further comprises a plurality of holes, each hole opening onto the tread surface when the tread is in the new condition and into a channel of an other wearing layer disposed radially inside the first wearing layer, wherein each hole opens into a channel at the point at which at least one transverse incision opening into the said channel starts, and wherein each hole has main cross-sectional dimensions which are at least equal to 30% of the transverse dimension of the channel into which the said hole opens.

3. The tread band according to claim 2 wherein the spacing (P) between two successive holes is less than or equal to one-fifth of the mean length of a contact patch between the tread surface and a running surface.

4. The tread band according to claim 2 wherein the first wearing layer further comprises one longitudinally oriented incision opening onto the tread surface when the tread is in the new condition and extending as far as the next other wearing layer to open into a channel of this next layer, this longitudinally oriented incision linking the holes together.

5. The tread band according to claim 1 wherein the transverse incisions of the at least one other wearing layer are incisions that are blocking in at least one direction.

6. The tread band according to claim 1 wherein the transverse incisions in the at least one other wearing layer are extended by complementary incisions that pass through at least one other wearing layer.

7. The tread band according to claim 1 wherein at least some of the transverse incisions are extended on the inside of the tread by a widened part that forms a channel of transverse overall orientation open at both ends.

8. The tread band according to claim 1 wherein each at least one other wearing layer has a maximum drainage volume that is at least equal to 60% of a maximum drainage volume of the first wearing layer, namely of the drainage volume of the tread band in the new condition.

* * * * *